United States Patent
Shmayda et al.

(10) Patent No.: US 10,486,969 B2
(45) Date of Patent: Nov. 26, 2019

(54) BALANCED CLOSED LOOP CONTINUOUS EXTRACTION PROCESS FOR HYDROGEN ISOTOPES

(71) Applicants: Kurion, Inc., Irvine, CA (US); Nuclear Sources and Services, Inc., Houston, TX (US)

(72) Inventors: Christopher Robert Shmayda, King City (CA); Robert D. Gallagher, Houston, TX (US)

(73) Assignee: Kurion, Inc., Irvine, CA (US)

( * ) Notice: Subject to any disclaimer, the term of this patent is extended or adjusted under 35 U.S.C. 154(b) by 417 days.

(21) Appl. No.: 14/294,033

(22) Filed: Jun. 2, 2014

(65) Prior Publication Data

US 2014/0356270 A1    Dec. 4, 2014

Related U.S. Application Data

(60) Provisional application No. 61/829,544, filed on May 31, 2013.

(51) Int. Cl.
| | |
|---|---|
| *C01B 4/00* | (2006.01) |
| *B01D 59/32* | (2006.01) |
| *G21F 9/12* | (2006.01) |
| *G21C 19/307* | (2006.01) |

(52) U.S. Cl.
CPC ............ *C01B 4/00* (2013.01); *B01D 59/32* (2013.01); *G21C 19/307* (2013.01); *G21F 9/12* (2013.01)

(58) Field of Classification Search
None
See application file for complete search history.

(56) References Cited

U.S. PATENT DOCUMENTS

| | | | | |
|---|---|---|---|---|
| 3,888,974 | A | | 6/1975 | Stevens |
| 3,981,976 | A | * | 9/1976 | Stevens ............... C01B 5/02 423/580.2 |
| 4,126,667 | A | * | 11/1978 | Butler ................ B01D 59/32 423/580.2 |
| 4,376,066 | A | * | 3/1983 | Bruggeman .......... B01D 59/32 376/314 |
| 4,471,014 | A | * | 9/1984 | den Hartog ........... B01D 59/32 261/DIG. 72 |
| 2005/0163703 | A1 | * | 7/2005 | Sugiyama ............. C01B 5/02 423/647.7 |

FOREIGN PATENT DOCUMENTS

| | | |
|---|---|---|
| FR | 2468399 A1 | 5/1981 |
| JP | 62171741 A * | 7/1987 |

OTHER PUBLICATIONS

PCT/US2014/040571 International Search report and written Opinion (Oct. 31, 2014).

* cited by examiner

*Primary Examiner* — Jennifer A Leung
(74) *Attorney, Agent, or Firm* — Michael Best & Friedrich LLP

(57) ABSTRACT

A system and method for tritium separation systems using a mixed bed catalytic exchange process in a Liquid Phase Catalytic Exchange/Closed Loop Continuous Process (LPCE/CLCP) system, that operates as a low temperature and low pressure continuous balanced process, designed to rapidly, economically and safely extract and isolate isotope specific products without generating unwanted products in the form of new waste streams.

20 Claims, 6 Drawing Sheets

BALANCED CLOSED LOOP CONTINUOUS EXTRACTION PROCESS FOR HYDROGEN ISOTOPES

CROSS REFERENCE TO RELATED APPLICATIONS

This application claims the benefit of U.S. Provisional Application No. 61/829,544, filed on May 31, 2013, the disclosure of which is incorporated herein by reference in its entirety.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD OF THE INVENTION

The method and apparatus described generally concerns processes and apparatus to remove tritium from a feed stock. In particular, it relates to a system and method to improve on existing tritium separation systems using a mixed bed catalytic exchange process in a Liquid Phase Catalytic Exchange/Closed Loop Continuous Process (LPCE/CLCP) system, that operates as a continuous balanced process at low temperature and pressure, designed to rapidly, and economically extract and isolate isotope specific products without generating unwanted products in the form of new waste streams.

BACKGROUND

This invention relates generally to the field of tritium isotope recovery from light and heavy radioactive water. Several large scale facilities have been built in Canada, France, Russia, and more recently South Korea, to extract tritium from heavy water moderator systems for nuclear reactors. Kalyanam and Sood, "Fusion Technology" 1988, pp 525-528, provides a comparison of the process characteristics of these types of systems. Similar, smaller, light water tritium recovery systems have been designed for fusion applications as well (see H. Yoshida, et al, "Fusion Eng. and Design" 1998, pp 825-882; Busigin et al, "Fusion Technology", 1995 pp 1312-1316; A. Busigin and S. K. Sood, "Fusion Technology" 1995 pp 544-549). Current large scale systems employ a front-end process to transfer tritium from water to elemental hydrogen, followed by a cryogenic distillation cascade to perform all or most of the hydrogen isotope separation.

Large scale membrane (gaseous) diffusion systems have been designed and built for uranium isotope separation. A thorough description of gaseous diffusion technology is provided by M. Benedict, T. Pigford and H. Levi, "Nuclear Chemical Engineering", McGraw Hill (1981). Gaseous diffusion has not been used for large scale hydrogen isotope separation.

Thermal diffusion columns have been used to separate hydrogen isotopes on a small scale since the 1950's as described by G. Vasaru et al, "The Thermal Diffusion Column", VEB Deutscher der Wissenschaften, Berlin, 1968. The use of this technology has been limited because it is not scalable to large throughputs.

Current large scale processes for water detritiation are based on the transfer of tritium from water to elemental hydrogen by: (a) a catalytic exchange reaction such as $DTO+D_2 \leftrightarrows D_2O+DT$; (b) direct electrolysis of water, i.e., $DTO \rightarrow DT+\frac{1}{2}O_2$; or (c) water decomposition by a suitable reaction such as the water gas shift reaction: $DTO+CO \rightarrow DT+CO_2$. (See Kalyanam and Sood "Fusion Technology" 1988, pp 525-528; A. Busigin and P. Gierszewski, "Fusion Engineering and Design" 1998 pp 909-914; D. K. Murdoch et al, "Fusion Science and Technology" 2005, pp 3-10; K. L. Sessions, "Fusion Science and Technology" 2005, pp 91-96; J. Cristescu et al, "Fusion Science and Technology" 2005, pp 97-101; I-R. Cristescu et al, "Fusion Science and Technology" 2005, pp 343-348.)

Recently a Pd/Ag membrane cascade has been proposed as an alternative technology to cryogenic distillation for application to International Thermonuclear Experimental Reactor (ITER). (D. L. Luo et al, "Fusion Science and Technology" 2005, pp 156-158). However, the hydrogen throughput of the proposed device was a factor of 1000 times smaller than that in CANDU reactor moderator water detritiation systems such as the Darlington Tritium Removal Facility. This alternative is feasible for a small degree of isotope separation such as upgrade of plasma exhaust gases containing approximately 50% deuterium and 50% tritium, to a concentration of 90% tritium suitable for fusion fuel recycling. The high tritium throughput for a large fusion device renders use of a small throughput technology, such as thermal diffusion, impractical. In a typical water detritiation application for a nuclear reactor the tritium throughput is miniscule by comparison to an ITER scale fusion machine; however the quantity of water to be processed is very large (i.e. millions of tons).

The current state of the art for large scale hydrogen isotope separation cryogenic distillation processes has the following drawbacks:

a. handling of liquid cryogens with associated hazards, such as high pressure potential upon warm-up and evaporation; thermal stresses due to very low temperature process conditions; requirement for a vacuum insulated cold-box vessel to contain the cryogenic equipment;

b. large liquid hydrogen and tritium inventory, mostly tied up in distillation column packing;

c. potential for blockage of process lines due to freezing of impurities;

d. complex and costly processing facility;

e. complex operation and maintenance;

f. non-modular process making it difficult to upgrade and to keep equipment spares; and g. requires batch operated dryers and a liquid nitrogen adsorber to purify feed to the cryogenic distillation cascade.

Large scale membrane diffusion has not been used in the past for hydrogen isotope separation due to a combination of commercial unavailability and the fact that enriching tritium from a few parts per million to 99+% purity requires a large number of discrete compression stages. To be competitive with cryogenic distillation, the number of compression stages needs to be reduced, especially at the high tritium concentration end of the process where compatibility and safety issues exist.

Thermal diffusion has been used successfully for small scale tritium separation, even up to 99+% pure tritium, but cannot be easily scaled for large throughput. This is because thermal diffusion columns must operate in the laminar flow regime, and scale-up would push column operation into the turbulent flow regime (R. Clark Jones and W. H. Furry, "Reviews of Modern Physics", 1946, pp 151-224). The alternative of constructing many small thermal diffusion columns in parallel is unattractive when the throughput requirement is large. Thermal diffusion columns also have low thermodynamic efficiency, which, while unimportant at small scale, becomes problematic at large scale.

PRIOR ART DISCUSSION

In a discussion of prior art, U.S. Pat. No. 3,974,048 ('048) generally describes a composite deuterium exchange process incorporating a catalytic exchange region and electrolytic cell region having an anode and cathode separated from each other by an electrolyte permeable diaphragm with liquid water and hydrogen gas being cycled through the two regions. It is preferred that the catalyst used in the catalytic exchange region is one that comprises at least one catalytically active metal selected from Group VIII of the periodic table, and have a sealing coating directly thereon of waterproof resin (impermeable to liquid water) and be permeable to water vapor from the liquid water and hydrogen gas permeating the coating to contact the catalytically active metal thereby to exchange hydrogen isotopes, while the coating retards poisoning of the catalyst by liquid water.

The '048 process further describes what is known in the art as a Combined Electrolysis Catalytic Exchange (CECE) process which includes the use of an electrolyzer to convert tritiated water into deuterium-tritium ("DT") gas and oxygen gas. In particular, tritiated feed water is introduced into the electrolyzer, which then converts said water to DT gas and oxygen gas. The DT gas is then introduced into the bottom of a column so as to flow upwards. The column includes a catalyst that is capable of converting heavy water and DT gas into deuterium gas (D2) and tritiated water. Heavy water is introduced into the top of the column from a recombiner so as to flow downwards in a counter flow to the rising DT gas at a molar ratio of 1:3 to 1:1. As the rising DT gas interacts with the heavy water in the presence of the catalyst, tritium from the gas is transferred to the heavy water, thereby converting the heavy water into tritiated water and deuterium gas ($D_2$). A tritium concentration profile is thereby created in the column in which the bottom of the column has the highest tritium concentration and the top of the column has the lowest. In the case of $D_2O$, the produced $D_2$ gas exits the column and is then reacted in a recombiner with the oxygen gas from the electrolyzer to produce the aforementioned heavy water. As tritiated feed water is added to the electrolyzer, tritium-full water is removed from the system.

While this system can be effective at removing tritium from tritiated water, its reliance on an electrolyzer and a recombiner adds to the complexity and costs associated with running the system. Further, electrolyzers and recombiners can negatively impact the efficiency of converting tritiated water into detritiated water. This is especially problematic in instances where large amounts of tritiated water needs to be processed in a relatively short time period, such as cleaning up after a nuclear reactor accident. What this application does not disclose is a system and method to improve on existing tritium separation systems using a mixed bed catalytic exchange process in a Liquid Phase Catalytic Exchange/Closed Loop Continuous Process (LPCE/CLCP) system, that operates as a low temperature and low pressure continuous balanced process, designed to rapidly extract and isolate isotope specific products without generating unwanted products in the form of new waste streams. Detritiation of the feed stream is the highest priority; the purity of the tritium is a secondary consideration.

In a further discussion of prior art, U.S. Pat. No. 5,468,462 titled "Geographically distributed tritium extraction plant and process for producing detritiated heavy water using combined electrolysis and catalytic exchange processes." Generally describes an apparatus and process that provides a remote site enrichment plant for producing an enriched stream of DT/D.sub.2 gas and a hydriding unit for forming a hydride of the DT/D.sub.2 gas for transportation. Pure tritium gas is produced at a local tritium extraction plant by reforming DT/D.sub.2 in a de-hydriding unit and passing the gas mixture through a chain of cryogenic distillation columns. The invention provides a safe and cost-effective method of detritiating heavy water. What this application does not disclose is a system and method to improve on existing tritium separation systems using a mixed bed catalytic exchange process in a Liquid Phase Catalytic Exchange/Closed Loop Continuous Process (LPCE/CLCP) system, that operates as a low temperature and low pressure continuous balanced process, designed to rapidly and safely extract and isolate isotope specific products without generating unwanted products in the form of new waste streams. Detritiation of the feed stream is the highest priority; the purity of the tritium is not a consideration.

Hydrophobic catalysts were initially conceived for the deuterium enrichment and tritium separation by hydrogen-liquid water isotopic exchange in the nuclear field. For this process, the conventional hydrophilic catalysts became inefficient due to loss of their activity upon "poisoning" of the catalysts by the direct contact with liquid water or by capillary condensation of water vapor. Therefore, it was necessary to prepare a catalyst, which repels the liquid water but allows the transport of the gaseous reactants and reaction products to and from catalytic active centers. In principle, the mode of preparation of hydrophobic catalysts is similar to that of conventional hydrophilic catalysts. The main differences between them consist of support nature, wet-proofing method and active metal deposition method. The main research was focused on the improvement of the catalyst's activity and stability, on their geometry as well as on the decrease of their cost. High performances have been proved in hydrogen isotopes separation process and recently, due to the new applications in the environmental field, the interest for this type of catalyst has become significant.

"Preparation of Hydrophobic Pt-Catalysts Used for Nuclear Effluents Decontamination", [Irina Vagner] discloses a wide range of preparative methods and applications of hydrophobic catalysts for the removal of tritium from liquid and gaseous effluents. A proposal for a new improved hydrophobic Pt-catalyst for hydrogen isotopes separation is also presented.

In Canadian Patent No. 907292; in 1972, Stevens published the first patent for a hydrophobic catalyst for water-hydrogen catalytic exchange at low temperature so that a liquid phase catalytic exchange can be carried out successfully. After several decades of research and development, there are mainly three types of hydrophobic catalysts used in the liquid phase catalytic exchange process now, including a Pt/C/inert carrier (Pt/C/IC), a Pt/C/poly-tetra-fluoro-ethylene (Pt/C/PTFE) and a Pt/styrene-divinyl-benzene copolymer (Pt/SDB). The Pt/C/IC has high strength, good chemical stability and strong activity, and at the same time has complex forming technique. The size and shape of the Pt/C/PTFE molecules are easily controlled, whereas the utilization ratio of platinum is low. The Pt/SDB has good activity, yet it shows low strength and small particle size. What this application does not disclose is a system and method to improve on existing tritium separation systems using a mixed bed catalytic exchange process in a Liquid Phase Catalytic Exchange/Closed Loop Continuous Process (LPCE/CLCP) system, that operates as a low temperature and low pressure continuous balanced process, designed to rapidly extract and isolate isotope specific products without generating unwanted products in the form of new waste streams. Detritiation of the feed stream is the highest priority; the purity of the tritium is not a consideration.

So as to reduce the complexity and length of the Detailed Specification, and to fully establish the state of the art in certain areas of technology, Applicant(s) herein expressly incorporate(s) by reference all of the following materials identified in each numbered paragraph below:

a. Ortman, M. S., L. K. Heung, A. Nobile, and R. L. Rabun, 1990, "Tritium Processing at the Savannah River Site: Present and Future," J. Vaac. Sci. Technol., A8, 3, 2881
b. M. Shimizu, S. Kiyota, R. Ninomya, "Hydrogen Isotope Enrichment by Hydrophobic Pt-Catalyst in Japan and Western Countries" Proceedings International Symposium on Isotope Separation and Chemical Exchange Uranium Enrichment, Tokyo, Japan, 1990
c. H. J. Fiek, J. Romaker, U. Schindewolf, Tritium Enrichment by Isotope Exchange Between Hydrogen and Water Using a Hydrophobic Catalyst for Nuclear Fuel Reprocessing", Chem. Eng. Tech. 52, 1980
d. Y. Asakura, H. Tsuchiya, H. Yusa, "Deuterium Exchange between Water Mists and Hydrogen Gas in a Hydrophobic Catalyst Bed", Nucl. Sci. Eng. 79, 1981
e. A. D. Belapurkar, N. M. Gupta, R. M. Iyer, "PTFE Dispersed Hydrophobic Catalysts for Hydrogen-Water Isotopic Exchange", Appl. Cat. 43, 1988
f. Gh. Ionita, I. Stefanescu, "The Separation of Deuterium and Tritium on Pt/SDBC/PS and Pt/C/PTFE Hydrophobic Catalysts" Fus. Tech., 28, 1995
g. Proceedings of the International Conference Nuclear Energy for New Europe, Portorož, Slovenia, Sep. 8-11, 2008
h. J. P. Butler, J. Rolston, H. Stevens, "Novel Catalyst for Isotopic Exchange between Hydrogen and Liquid Water" ACS Symp. 1978, Series 68
i. I. Balasanian, "Concentration and characterization of catalyst for chemical industry (in Romanian), I. P. Iasi, 1987
j. L. S. Swartz, M. Seabaugh, C. T. Holt, J. Dawson, "Fuel Processing Catalysts Based on Nanoscale Ceria", Fuel Cells Bulletin, 30, 2001
k. O. Korotkikh, R. Farrauto, "Selective catalytic oxidation of CO in H2: fuel cell applications", Catal. Today, 62, 2000
l. I. Popescu, Gh. Ionita, D. Dobrinescu and I. Stefanescu—"Preparation of hydrophobic Pt-catalysts for tritium removal from nuclear effluents", Journal of Int. Res. Pub., Vol. 1, Issue Ecology, 2006, ISSN 1311-8978
m. K. T. Chuang, R. J. Quatini, D. R. P. Thatcher, L. J. Puissant—"Development of Wet proofed Catalyst Recombiner for Removal of Airborne Tritium", Appl. Cat. 30, 1987
n. Gh. Ionita, M. Peculea—Patent RSR 147684/1994-"Preparation method for hydrophobic catalysts" (in Romanian)

Applicant(s) believe(s) that the material incorporated above is "non-essential" in accordance with 37 CFR 1.57, because it is referred to for purposes of indicating the background of the invention or illustrating the state of the art.

SUMMARY OF THE INVENTION

The primary object of the invention is to improve on existing tritium separation systems using a mixed bed catalytic exchange process in a Liquid Phase Catalytic Exchange/Closed Loop Continuous Process (LPCE/CLCP) system, that operates as a low temperature and low pressure continuous balanced process, designed to rapidly and safely extract and isolate isotope specific products without generating unwanted products in the form of new waste streams.

In one embodiment, the present invention discloses a closed loop continuous hydrogen isotope extraction system using a steady state cyclical dual column extraction, comprising a first liquid phase catalytic exchange column to receive a mixture of clean hydrogen gas and contaminated feed water comprising at least one hydrogen isotope in the form of tritium, wherein the liquid phase catalytic exchange column includes one or more of a hydrophobic catalyst operative to facilitate the exchange of the clean hydrogen gas with the hydrogen isotope in the feed water resulting in the generation of the hydrogen isotope as a gas and de-tritiated water as a liquid in the first catalytic exchange column. In some embodiments, the present invention also includes a second liquid phase catalytic exchange column to receive a mixture of gas generated from the first liquid phase catalytic exchange column containing the hydrogen isotope and de-tritiated water generated by the first liquid phase catalytic exchange column, wherein the second liquid phase catalytic exchange column includes a second hydrophobic catalyst operative to facilitate the exchange of the gas containing the hydrogen isotope and the de-tritiated water resulting in the generation and release of the hydrogen as clean hydrogen gas and contaminated water comprising at least one hydrogen isotope in the form of tritium, and wherein the second waterproof catalyst is further operative to process at least one of larger and smaller volumes of material than the first waterproof catalyst. The present invention also includes a pump for establishing and maintaining a circulating profile through the first and second liquid phase catalytic exchange columns. The present invention further includes a first valve to introduce into the steady state cyclical dual column process additional contaminated feed water, wherein the additional feed water is introduced into the circulating profile of the first liquid phase catalytic exchange column, and a second valve to collect from the steady state cyclical dual column process a fraction from the circulating profile. A first flow detector for monitoring the flow rate of the introduced contaminated feed over time, and a second flow detector for monitoring the flow rate of the at least one of collected enriched fraction and collected clean fraction is also included, wherein the difference in fractions results in at least one of: (a) a steady state operation when the fractions introduced and fractions collected are the same, (b) a reduction in system concentration when the fractions introduced are less than the fractions collected, and (c) an increase in system concentration when the fractions introduced are more than the fractions collected.

In another embodiment, the present invention is a closed loop continuous hydrogen isotope extraction method using a steady state cyclical dual column extraction, including the steps of receiving a mixture of clean hydrogen gas and contaminated feed water comprising at least one hydrogen isotope in the form of tritium in a first liquid phase catalytic exchange column, wherein the liquid phase catalytic exchange column includes one or more of a hydrophobic catalyst operative to facilitate the exchange of the clean hydrogen gas with the hydrogen isotope in the feed water resulting in the generation of the hydrogen isotope as a gas and de-tritiated water as a liquid in the first catalytic exchange column; receiving a mixture of gas generated from the first liquid phase catalytic exchange column containing the hydrogen isotope and de-tritiated water generated by the first liquid phase catalytic exchange column in a second liquid phase catalytic exchange column, wherein the second liquid phase catalytic exchange column includes a second hydrophobic catalyst operative to facilitate the exchange of the gas containing the hydrogen isotope and the de-tritiated water resulting in the generation and release of the hydrogen as clean hydrogen gas and contaminated water comprising at least one hydrogen isotope in the form of tritium, and wherein the second waterproof catalyst is further operative to process at least one of larger and smaller volumes of material than the first waterproof catalyst; using a pump for establishing and maintaining a circulating profile through the first and second liquid phase catalytic exchange columns; using a first valve to at least one of continuously and periodically introduce into the steady state cyclical dual column process additional contaminated feed water, wherein the additional feed water is introduced into the circulating profile of the first liquid phase catalytic exchange column; using a second valve to at least one of continuously and periodically collect from the steady state cyclical dual column process at least one of an enriched fraction from the circulating profile and a clean fraction from the circulating profile; using a first flow detector for monitoring the flow rate of the introduced contaminated feed over time, and a second flow detector for monitoring the flow rate of the at least one of collected enriched fraction and collected clean fraction, wherein the difference in fractions results in at least one of: (a) a steady state operation when the fractions introduced and fractions collected are the same, (b) a reduction in system concentration when the fractions introduced are less than the fractions collected, and (c) an increase in system concentration when the fractions introduced are more than the fractions collected.

In another embodiment, the molar fluxes in the first and second columns are independent of each other and adjusted to optimize fractions.

In another embodiment, the water and molar fluxes in the first and second column are independent of the feed molar flux.

In another embodiment, the hydrophobic catalyst in the liquid phase catalytic exchange columns are mixed and packed with a non-catalytic hydrophilic packing to enhance the exchange between water and water vapor, wherein the mixed catalytic bed results in acceleration of the at least one of the clean hydrogen-water isotope exchange in the first column and the hydrogen isotope-clean water exchange in the second column.

In another embodiment, the closed loop steady state operation does not generate a waste stream, wherein the waste stream is at least one of hydrogen gas, hydrogen isotope gas and oxygen gas. The dual column results in a managed mass balance of circulating fractions, and the circulating fractions consist of: clean hydrogen gas, clean water, tritium gas, and tritiated water.

In another embodiment, clean hydrogen gas is introduced through a third valve. The source of the clean hydrogen gas is at least one of a hydrogen gas generator and bottled gas, wherein the gas generator is an electrolyzer. In another embodiment, the fractions introduced and fractions collected in the steady state operation include not collecting fractions and introducing fractions.

In connection with the embodiments described herein, another object of the invention is to use two liquid phase catalytic exchange (LPCE) columns in a series to detritiate water without the use of an electrolyzer.

Another object of the invention is to eliminate the most capital and energy intensive component in a conventional CECE system.

Another object of the invention is to provide a process in which the water and gas molar fluxes in the exchange columns are independent of each other and adjusted to optimize the detritiation factor. In the CECE process, the gas flux is determined by the Ecell and the water flux is set relative to the gas flux. For useful work, the gas flux should equal or exceed the water flux; a situation in which the water flux exceeds the gas flux is untenable. In the present invention the ratio of fluxes (say gas to water) can be set greater to, equal to, or less than unity.

Another object of the invention is to provide a process in which the water and gas molar fluxes in the exchange columns are independent of the feed molar flux.

Another object of the invention is to provide a process in which the clean-water effluent molar flux is fixed to be equal to the feed molar flux.

Another object of the invention is to provide a system wherein the feed and effluent draw points are located at strategic concentration points in the columns to maximize the Detritiation Factor and the two draw points are independent of each other and driven by specific applications.

Another object of the invention is that the tritiated water is fed into the system at or about the top of the first column and clean detritiated water can be drawn from the system at the bottom of the first column and that hydrogen and oxygen gases are not released.

Another object of the invention is that the configuration can be used to concentrate the activity of the feed water, where the tritiated water is fed into the system and concentrated tritiated water is extracted from the system at a point between the first and second columns, where the system operates without the need for cooling power.

Another object of the invention is to provide a system used to concentrate and transfer the activity of the feed water to hydrogen gas, where tritiated water is fed into the system at a point at or about the mid-point of the system and concentrated high activity tritium gas can be extracted from the system at a point between the first and second columns, and where oxygen is extracted as a component of the clean water at or about the bottom of the second column resulting in an enhancement of the activity of the hydrogen gas in preparation for isotopic separation.

Another object of the invention is to provide a process in which tritiated gas can be fed into the system at or about the mid-point of the system and clean tritium-free hydrogen can be drawn from the system at or about the bottom of the second column and operates like a gas purifier.

Another object of the invention is to provide a process that uses makeup hydrogen gas that can be supplied from either a hydrogen gas cylinder or an electrolyzer, where the makeup gas addition is on the clean hydrogen side of the system so that neither the pressurized gas supply nor the electrolyzer needs to be tritium compatible.

Another object of the invention is to provide a process in which the maximum usable activity of tritiated water is determined by the radiation stability of the catalyst and column performance requirements resulting in significantly higher water activity levels.

Another object of the invention is to provide a process in which the system does not continuously discharge hydrogen from the system unless the configuration is set to produce tritiated hydrogen as a product stream.

Another object of the invention is to provide a large-scale isotopic exchange based process for detritiation of light and heavy water that is simpler and more economical than a conventional CECE process.

Another object of the invention is to provide a process that is simpler to start-up, shutdown and operate than a conventional CECE process.

Another object of the invention is to provide a modular process that can be designed and upgraded more simply than a conventional CECE process.

Another object of the invention is to provide a process based on standardized modules that simplify maintenance and storage of equipment spares.

Another object of the invention is to provide a process capable of detritiating water containing tritium and producing a product with a tritium concentration well within acceptable environmental release limits.

Another object of the invention is to provide a process which includes humidifiers, dehumidifiers, pumps and heaters in the process to further improve system efficiency.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a process for tritium concentration and removal from water by transfer of tritium from water by a catalytic conversion of a feed stream to hydrogen isotopes and removing the isotopes by one of several methods. The process takes advantage of scalability of large throughputs of low tritium concentrations with the simplicity of collection and safe storage of the tritium as a hydride at low pressure (approximately 1 atmosphere).

Although the best understanding of the present invention will be had from a thorough reading of the specification and claims presented below, this summary is provided in order to acquaint the reader with some of the new and useful features of the present invention. Of course, this summary is not intended to be a complete litany of all of the features of the present invention, nor is it intended in any way to limit the breadth of the claims, which are presented at the end of the detailed description of this application.

The present invention provides among other things a process and apparatus to the current problems associated with converting large volumes of tritiated water into detritiated water. The solution is premised on a system that is capable of efficiently converting tritiated water into detritiated water without the use of an electrolyzer and/or a recombiner. The present invention further provides a system and method that operates as a continuous balanced process at low temperature and pressure, designed to rapidly and economically extract and isolate isotope specific products without generating unwanted products in the form of new waste streams.

Other features of the present invention will be apparent from the accompanying drawings and from the detailed description that follows. Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for," and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently preferred embodiments of the invention are illustrated in the accompanying drawings, in which.

DETAILED DESCRIPTION

Figure 1:
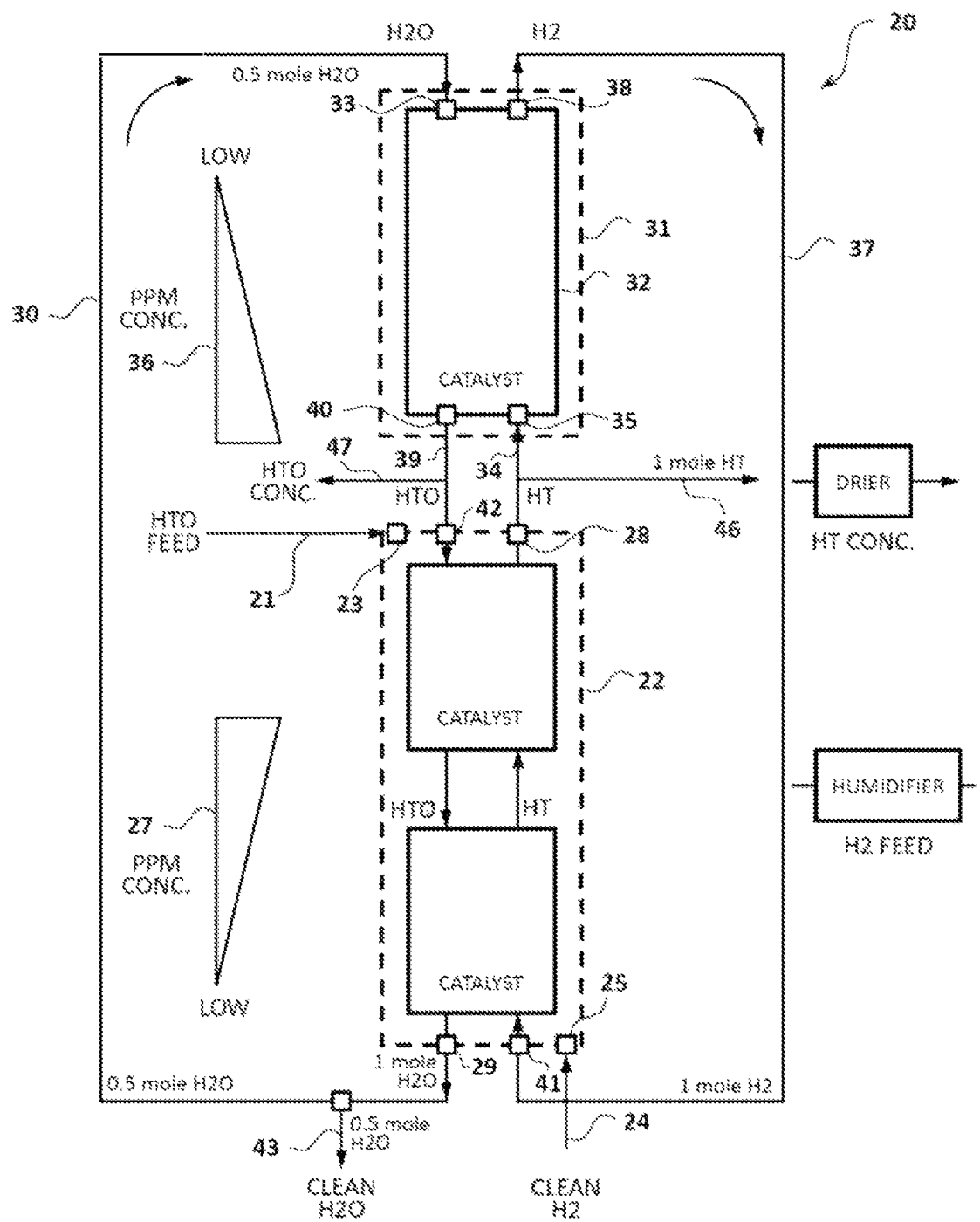
FIG. 1 provides an illustrative embodiment of a light/heavy water detritiation process.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

In the following examples of the illustrated embodiments, references are made to the accompanying drawings which form a part hereof, and in which is shown by way of illustration various embodiments in which the invention may be practiced. It is to be understood that other embodiments may be utilized and structural and functional changes may be made without departing from the scope of the invention.

Detritiation Process Overview

Generally, for the discussion of tritium removal (detritiation), it should be understood that the process described below as the preferred embodiment discloses the extraction of tritium from tritium-rich heavy or light water according to any of the following reactions:

$$DTO + D_2 \rightarrow D_2O + DT \quad [101]$$

$$D_2O + DT \rightarrow DTO + D_2 \quad [102]$$

$$HTO + H_2 \rightarrow H_2O + HT \quad [103]$$

$$H_2O + HT \rightarrow HTO + H_2 \quad [104]$$

or more generally the following overall reaction:

$$QTO + Q_2 \rightarrow Q_2O + QT \quad [105]$$

$$Q_2O + QT \rightarrow QTO + Q_2 \quad [106]$$

Here Q denotes either one of the two hydrogen isotopes: 'H' or 'D' but not 'T' in an effort to draw attention to the movement of 'T' between water (either liquid or vapor) and gas. It is generally understood in many standard publications the notation for Q is $^{1,2,3}H$, where $^1H$ is protium, $^2H$ is deuterium and $^3H$ is tritium. For the sake of convenience Q is used to represent either $^1H$ (protium,) or $^2H$ (deuterium) in this discussion.

The equations provided above are the equilibrium equations that express the degree to which the quantities on the left and right will distribute but they represent only part of the process. The essence of the transfer in one direction or the other is a two-step process:

Isotopic exchange between gas and vapor over a catalyst (driven by the equilibrium equations), and Condensation of the enriched (or depleted) vapor on a wetted surface and transfer of the target proton/deuteron/triton to the liquid phase with a water vapor pressure over the liquid (classical condensation/evaporation).

In all these reactions, tritium transfer occurs from water to elemental hydrogen, and depending on the local concentrations, the transfer can go in either direction; for simplicity, the balance of the discussion will use Q to denote a hydrogen isotope. Reactions [105] and [106] describe the relationships of four basic circuits, one of which is the tritium circuit [QT]. The process steps include initializing a tritium exchange process to achieve a basic and sustaining reaction in the columns according to [105] and [106].

As described above, the feed stream that is introduced into the columns, at a certain point in the initialization cycle, reaches a base optimal operational temperature and process equilibrium where the two reactions [105] and [106] are sustained. Reaction [105] is established in the first isotopic exchange column 22, and reaction [106] is established in the second isotopic exchange column 31.

When no additional feed stock is introduced and no clean water is drawn, the system is at equilibrium. According to reactions [105] and [106], for every one mole of QTO introduced into the system one mole of $Q_2$ is introduced to produce one mole of $Q_2O$ and mole of QT. As additional feed stream is introduced, the tritium will concentrate in the form of QT in the system, which may be a desired outcome if the goal is simply a volume reduction or concentration of T from the feed stream.

In the first application of the invention, referring now to the figures, the preferred embodiment is illustrated for the physical method for the removal of tritium from either light or heavy water. FIG. 1 depicts a system 20 that can be used to convert tritiated water into detritiated water without the need of an electrolyzer or a recombiner. The system as described is used to detritiate either tritiated heavy water or tritiated light water. Water is "detritiated" when some, most, or all of the tritium is removed from the initial tritiated, or feed water 21.

One embodiment is a water-hydrogen exchange column using a liquid phase catalytic exchange (LPCE). The LPCE processes rely on hydrophobic catalysts to catalyze the exchange reaction between hydrogen gas and water vapor. The hydrophobic catalyst comprises a platinum (Pt) catalyst that is formed using a compression molded process directly supported on Teflon Pt/C/PTFE substrate, comprising approximately 0.8% weight platinum deposited on the catalyst supports resulting in 3 mm length×3 mm width and 1.5 mm thickness. The catalyst is then equally mixed and randomly packed with a non-catalytic hydrophilic packing to enhance the exchange between water and water vapor; the mixed catalytic bed results in acceleration of the hydrogen-water isotope exchange.

In the system 20, the first isotopic exchange column 22 comprises an elongated cylindrical column having a first end, a second end, stainless steel tubing wrapped with a heating mantle, an over coat with insulation, the column having a diameter of 10 mm and a height of 15 m with a hydrogen gas flow rate of 200 standard liters per minute (SLPM), a counter water flow rate of 100 ml/min, and a feed/draw rate of 50 ml/min. The first column 22 contains both liquid and gas flow distributors or diffusers to enhance the distributions and mixing in the column. The feed water 21 is introduced at or about the mid-point of the first column 22 via a first inlet 23. The second isotopic exchange column 31 has a diameter of 10 mm and a height of 5 m; in alternate embodiments, the first and second column diameters and lengths may be multiples or fractions of the preferred embodiment.

In the system 20, $Q_2$ feed gas 24 is preheated by a heater and introduced into the bottom of the first column 22 via a second inlet 25 creating a counter flow, i.e., will flow in the opposite direction of the tritiated water in the first column 22.

Figure 2:
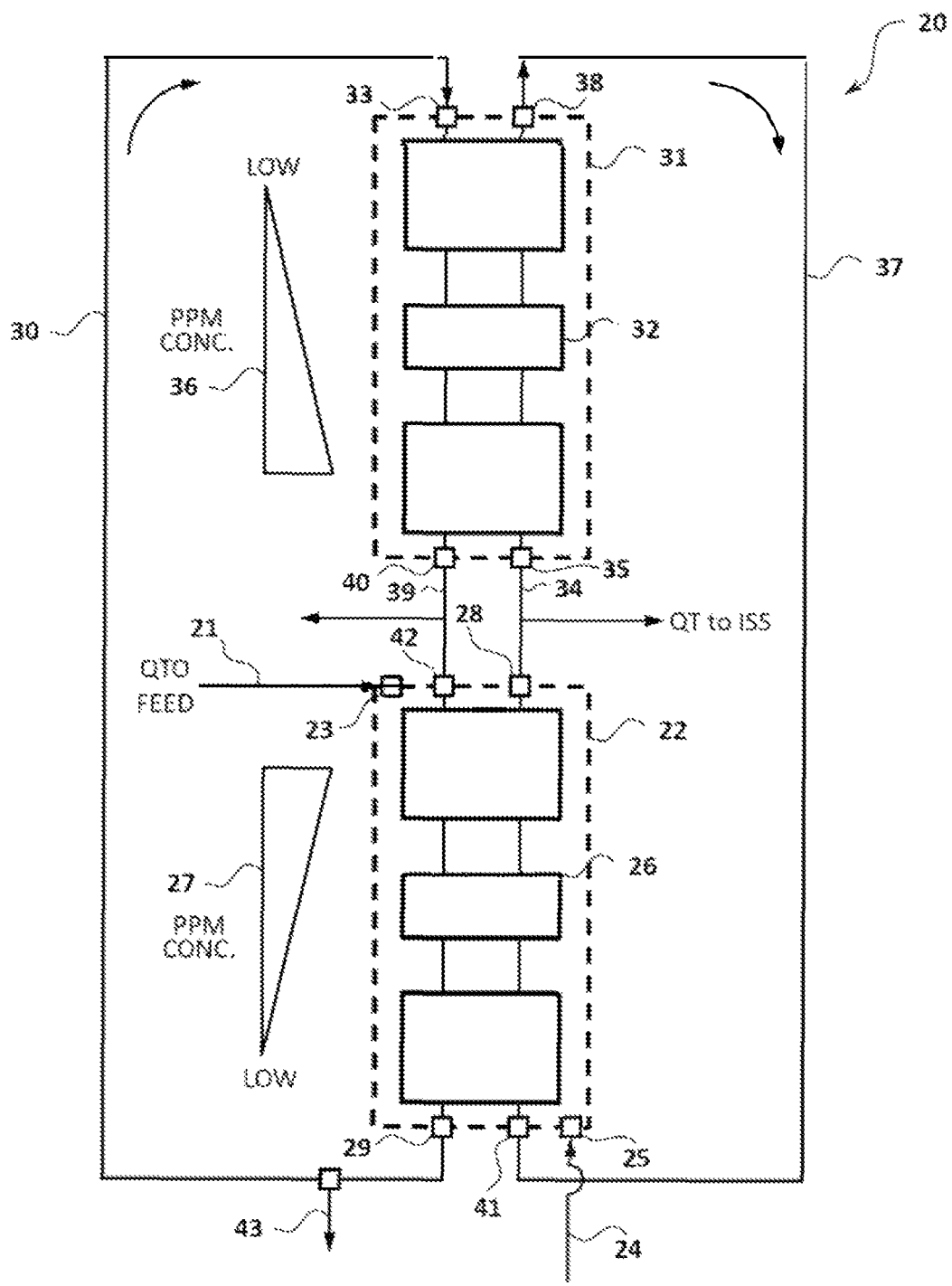
FIG. 2 provides an illustrative alternate embodiment of a light/heavy water detritiation process.

The first isotopic exchange column 22 includes the catalyst 26 (FIG. 2) (described in detail above) for catalyzing the reaction of tritiated light water with $Q_2$ gas that has been diffused into feed water forming a (QT) gas according to reaction [105].

The $Q_2$ gas is supplied to the first isotopic exchange column 22 from an electrolyzer adapted to produce the $Q_2$ gas. Alternately the $Q_2$ gas is supplied from a remote location such as a storage tank. It is noted that the electrolyzer discussed above is not used to convert the tritiated water into $Q_2$ gas and oxygen. The $Q_2$ feed gas is introduced into the first column 22. To aide in initiating and maintaining the catalytic reaction, temperature ranges of 35-250 degrees centigrade are used at pressures of 500-1100 mbar; in alternate embodiments, pressures and temperatures may be multiples or fractions of the preferred embodiment.

These reactions create a tritium concentration gradient 27 of highest concentration at the top near the first inlet 23 and lowest concentration at the bottom near the second inlet 25. Tritiated gas QT 34 emerges from a first outlet 28 at the top of the first column 22 near the first inlet 23. Clean or detritiated $Q_2O$ emerges from a second outlet 29 at the bottom of the first column 22 near the second inlet 25.

A portion of the clean or detritiated water may be transferred out of the system 20 via a drain 43. The detritiated water transferred out via the drain 43 may be stored or it may be further used in a process at the same location. For example, the detritiated water may be stored in a container, reservoir, or holding tank for later transport or use.

The clean or detritiated $Q_2O$ 30 is transferred via a third inlet 33 into a second isotopic exchange column 31 that is filled with an isotopic exchange catalyst 32. The QT gas 34 is transferred into the bottom of the second exchange column 31 via a fourth inlet 35.

The first and second columns, 22 and 31 respectively, in the preferred embodiment are constructed such that the second isotopic exchange column 31 is capable of catalyzing the reaction of water and QT gas into tritiated water, QTO, and $Q_2$ gas; this reaction is represented as reaction [106].

The system 20 is implemented such that the detritiated $Q_2O$ liquid being introduced into the second column 31 at third inlet 33 will act as a counter flow to the rising QT gas introduced at fourth inlet 35 in the second column 31 that is located above the first column 22. The QT gas rises in the second column 31. The sinking $Q_2O$ exchanges with the introduced QT gas as it traverses the second catalyst 32 and is mixed with the clean $Q_2O$ resulting in a catalyzed reaction according to reaction [106]. This isotopic exchange establishes a tritium concentration gradient 36 with low concentration at the top and high concentration at the bottom of the second column 31. Clean $Q_2$ 37 emerges from a third outlet 38 at the top of the second column 31 near the third inlet 33. Tritiated $Q_2O$ emerges from a fourth outlet 40 as QTO 39 at the bottom of the second column 31 near the fourth inlet 35.

The conditions in the second column 31 are such that tritiated water QTO and $Q_2$ gas are produced using temperature ranges and pressures in the same ranges as the first exchange column 22 for initializing and sustaining the second catalytic reaction.

In the system 20 the clean $Q_2$ 37 is provided into the first column 22 via a fifth inlet 41. The clean $Q_2$ gas produced in the second column 31 is combined with the feed gas prior to introduction into the first column 22 and introduced together via a single inlet at fifth inlet 41. The majority of the gas will come from the second column 31. However, additional feed gas may be needed to maintain the proper molar ratio between liquid and gas. The tritiated water 39 produced by the second column 31 is provided into the first column 22 via a sixth inlet 42.

In a closed loop system, where there is no consistent introduction of feed water 21 and no detritiated water is transferred via a drain 43, there is no generation of product and the molar ratio of hydrogen gas to feed water is operatively efficient at 1 in the preferred embodiment, but in alternate embodiments, molar ratios ranging from 0.5 to 4 may be desired, while still remaining closed loop. Once the tritium concentration gradients 27 and 36 are established in the columns, the tritiated water (QTO) feed 21 can be introduced at first inlet 23 and detritiated water can be drawn off at the drain 43 for later use or transport.

In the system 20, the tritiated feed water 21 is introduced at any point between the mid-point and top of the first column 22 via the first inlet 23. The tritium in this feed will concentrate into the top of the first column 22 and bottom of the second column 31 and the excess liquid from the feed can be drawn from the bottom of the first column 22 as clean $Q_2O$ via a drain 43. This process will allow a feed of tritiated water (QTO) 21 and a product of detritiated water ($Q_2O$) without any need for electrolysis or recombination, therefore greatly reducing the complexity and the energy needs of the whole process.

Once the dual columns have been initialized, continuous operations for concentration can start with the addition of additional feed stock and the systematic removal of product in a controlled operation.

As an example of the preferred embodiment, FIG. 1, the first column 22 can perform perfect work, i.e. 99.9%+ of the Tritons get transferred to the QT stream, and thus the water at the bottom of the first column 22 is below release standard, it can be removed from the system or used for recirculation at the top of the second column 31 at third inlet 33. If the molar ratio of QTO to $Q_2$ is 1:1 as described above, the system operates at equilibrium. So if 1 mole of QTO (waste water to be treated) flows down the first column 22, 1 mole of $Q_2$ will be needed for the catalytic exchange resulting in 99.9%+ of T from QTO to be released as QT gas resulting in the formation of $Q_2O$.

The second column 31 catalyst 32 operates at similar levels of exchange efficiency as the catalysts do in the first column 22 (i.e. 99.9%+); alternately it may be desirable to establish a set of operating conditions where the two column catalysts operate at distinctly two different operating efficiencies. Basically all of the tritiated gas 34 rising into fourth inlet 35 in the second column 31 as QT is transferred to the $Q_2O$ stream introduced in the catalyst 32, releasing $Q_2$. The system is now operating at equilibrium.

However, since the second column 31 only needs 0.5 mole of $Q_2O$ to operate at maximum efficiency, and if 0.5 mole of water is drawn down the drain 43, then there is a shifting of the molar ratio of the second column 31 of $Q_2O$ to QT to 1:2. Shifting this ratio effectively does not diminish efficiency and results in a doubling of the concentration of QT in the form of QTO from its original concentration and releasing the $Q_2$ gas at the top of the second column 31 at third outlet 38. Since the gas is $Q_2$ and is below release standard it can be recirculated to the bottom of the second column 31 from third outlet 38 to fifth inlet 41.

At initialization, 1 mole of QTO waste water is introduced at sixth inlet 42 of the first column 22, and in order to transfer all of the T from the QTO to $Q_2O$, a flow of ratio of 1:1 is required by adding 1 mole of $Q_2$ at fifth inlet 41. The catalytic exchange results in 1 mole of clean water at second outlet 29 and 1 mole of tritiated QT at first outlet 28. If no makeup hydrogen is added at the second inlet 25 or any QT removed at 46, then 1 mole of QT will flow into the second column 31. The second column 31 only needs 0.5 mole of clean $Q_2O$ to perform the full isotopic exchange in the first column 22. So, from the 1 mole of clean $Q_2O$ available at second outlet 29, one can draw or partially divert 0.5 mole of clean $Q_2O$, which is now below release standard, and let the other 0.5 mole of clean $Q_2O$ go to third inlet 33 at the top of the second column 31. Again, since the second column 31 only needs 0.5 mole of $Q_2O$ to operate efficiently, this $Q_2O$ introduced at third inlet 33 is catalyzed and captures all of the QT introduced at fourth inlet 35 producing 0.5 mole of QTO with twice the concentration of tritium than at the beginning of the cycle (or put differently ½ of the water and the same amount of tritium because the columns are 99.9% efficient).

If a decision is made not to draw and remove from the system any concentrated QTO at 47, the 0.5 mole of QTO arrives back in the first column 22 at sixth inlet 42. In the meantime, the clean 1 mole of $Q_2$ at third outlet 38 is ready for re-use at the bottom of the second column 31 at fifth inlet 41. Since 1 mole of $Q_2$ is available, the system 20 has the capacity of reacting with 1 mole of QTO to react with this 1 mole of $Q_2$. Since only 0.5 mole of QTO is available, additional 0.5 mole of feed water can now be added to the 0.5 mole of QTO coming from the second column 31 at sixth inlet 42. This recirculation loop continues to run until QTO is processed or until the system reaches the limit in concentration allowed by the sizing of the column. In the second case, one can decide to draw very concentrated tritiated flow (as an example 0.1 moles at a time) either from 47 as highly concentrated tritiated QTO liquid; or 46 as highly concentrated tritiated QT gas.

The characteristics of both columns (respective diameter and length) are sized such that these two conditions above are true at the end of the concentration cycle. As an example, the incoming waste water is 1 ppm of tritium. Within the design constraints of the catalytic beds in the system, for every 1 mole of QTO that is introduced in the first column 22 at 1 ppm of a mole of tritium; and the recirculation loop (volume reduction) keeps going, the tritium concentration increases by the concentration factor depicted above . . . in a geometric series (1 ppm, then 2, then 4, then 8 . . . n), based on sizing and is limited to the concentrations of tritium it can hold. Depending on the incoming waste stream, one can either have many stages one after the other or design a large and long column.

As the feed water continues to add tritium into the system, the concentration gradient will increase through the columns until there is a breakthrough of tritium at the top of the first column 22 and bottom of the second column 31. To keep the concentration gradient stable, concentrated tritium would need to be drawn at 47 at the rate of 0.001 mole/hr. One mole of tritiated water is removed thus reducing the volume to 0.001 mole of highly tritiated water and 0.999 mole of clean water which is a volume reduction of 1000×. The draw down must be done to maintain system equilibrium.

Process Variations of the Disclosed Embodiment

The present invention will be described in greater detail by way of specific examples of alternate embodiments. The following examples are offered for illustrative purposes only, and are not intended to limit the invention in any manner. Those of skill in the art will readily recognize a variety of noncritical parameters which can be changed or modified to yield essentially the same results.

QT Removal

Figure 4:
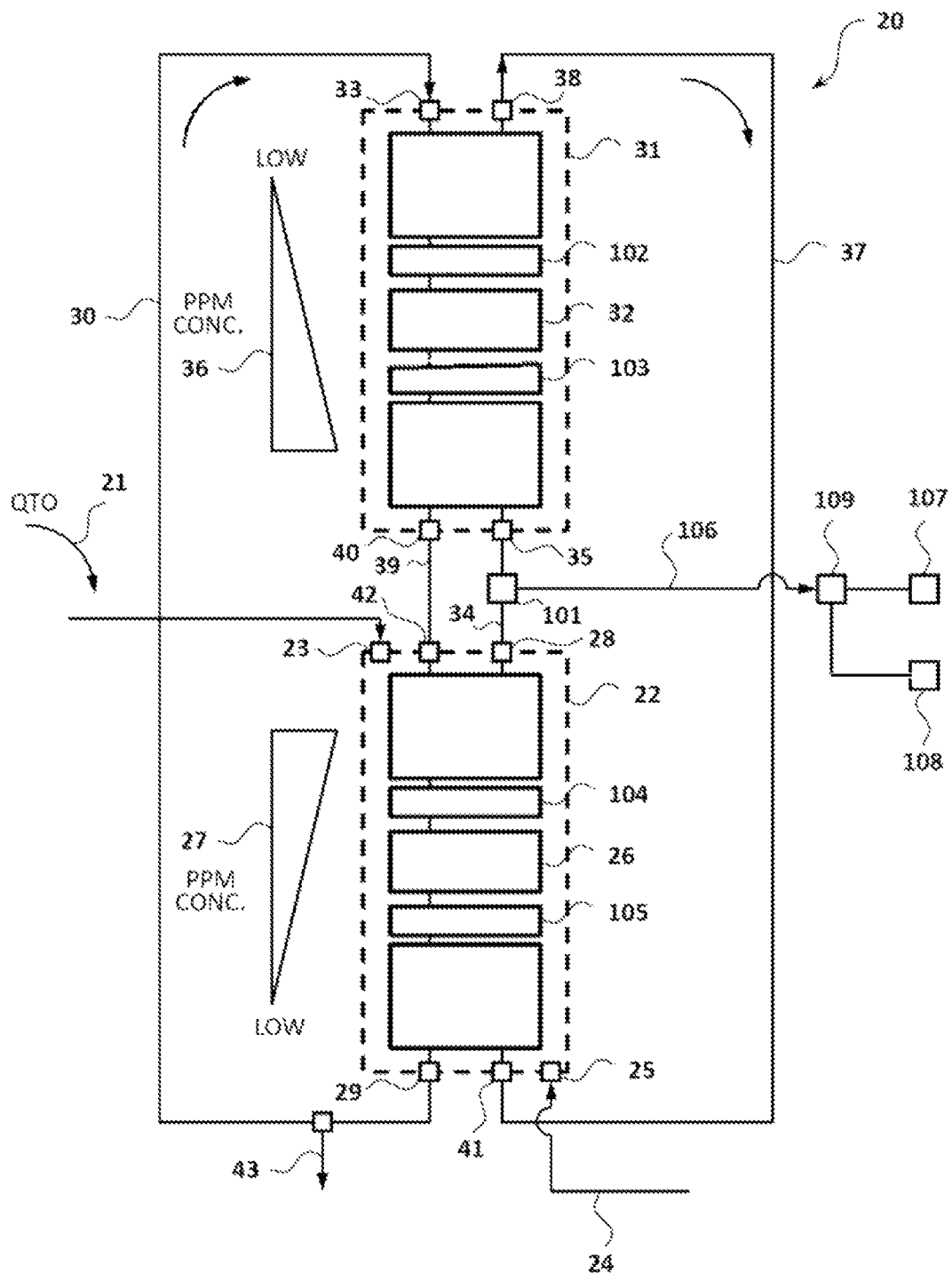
FIG. 4 shows a QT gas removal step in the detritiation process.
Figure 5:
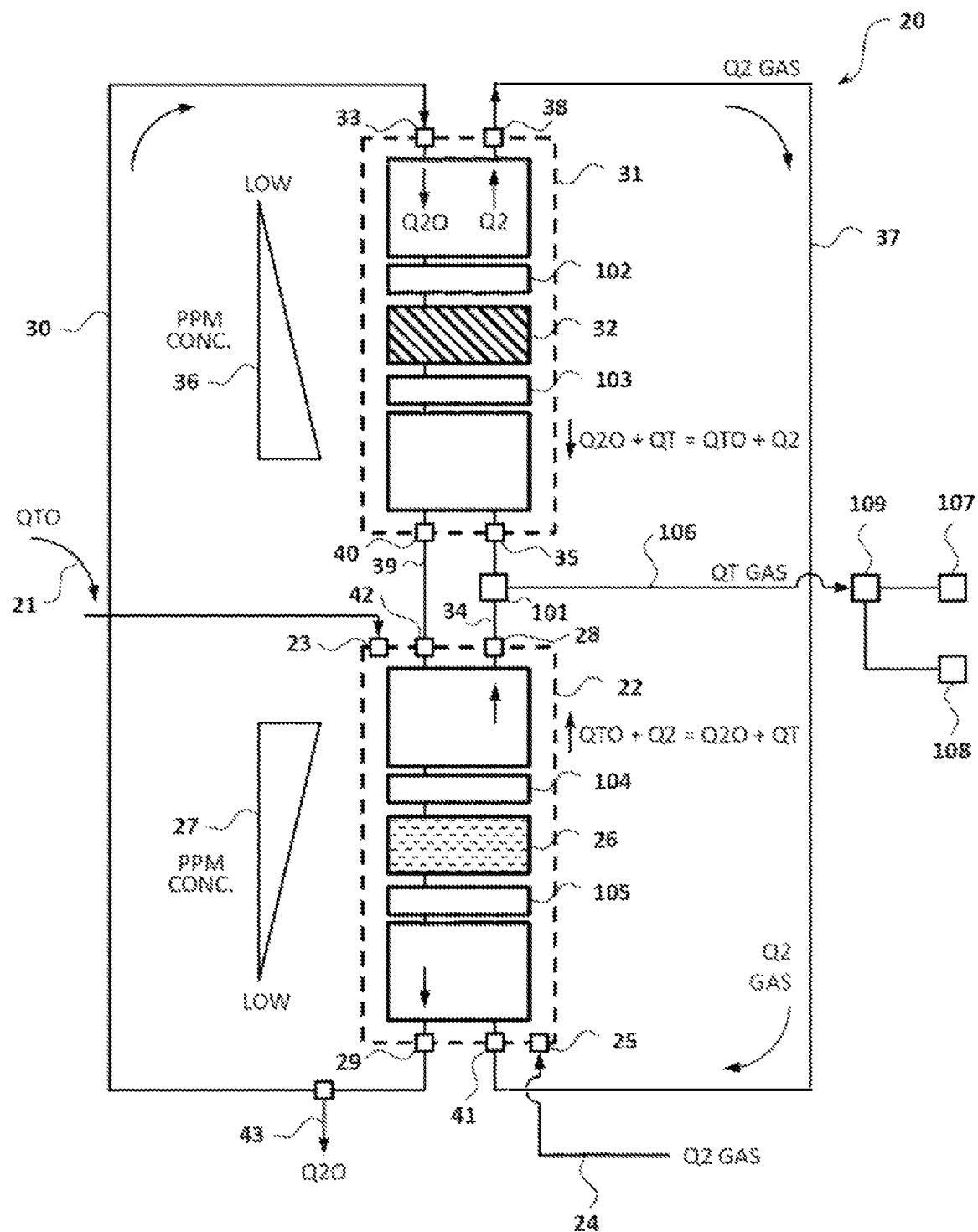
FIG. 5 shows the location and make up of catalytic beds.
Figure 6A:
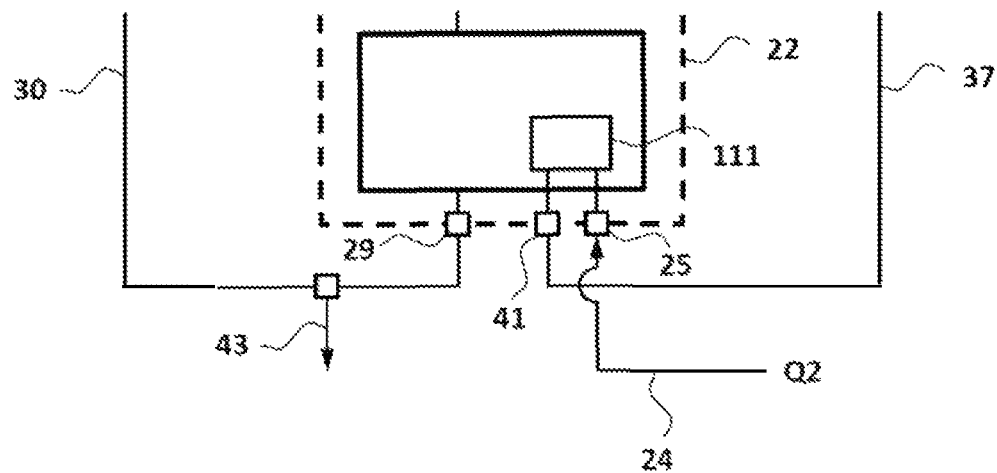
FIGS. 6A and 6B depict two hydrogen loop options.
Figure 6B:
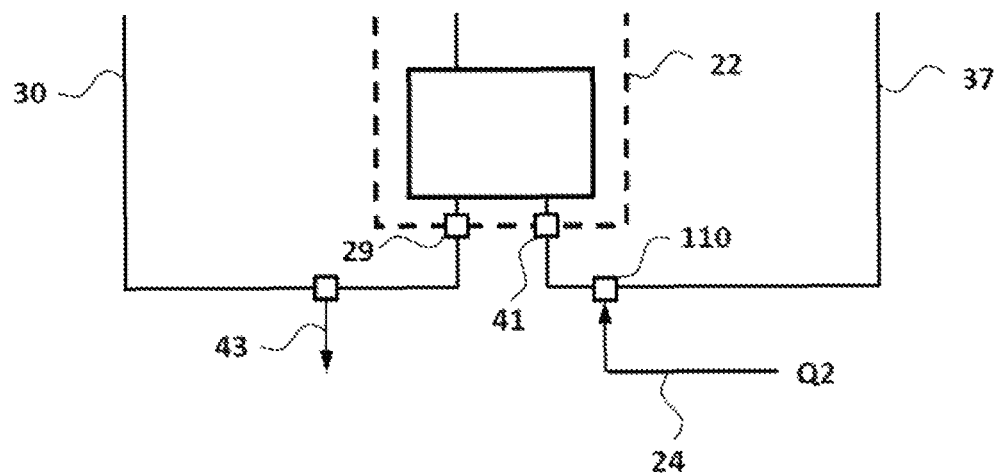

In an alternate embodiment, if concentrated QT is required rather than QTO, then the QT gas can be removed from FIG. 4 valve 101. For every mole of QT gas removed, one mole of $Q_2O$ has to be removed from drain 43 and an additional 1 mole of $Q_2$ gas must be added at second inlet 25.

Further, if concentration of QT for a volume reduction operation is not desired, the process can be maintained at equilibrium through a removal step in the QT cycle. For every one mole of $Q_2O$ diverted at the drain 43 and removed from the system, the one mole of QT remains to either be catalyzed with one mole of $Q_2O$ or can be removed from the system as QT gas 34 through the addition of a valve 101, shown in FIG. 4. The gas removed through valve 101 and piping 106 and process selection valve 109 can simply be compressed and transferred to an external processing facility 107 or presented to a process 108 designed to absorb the elemental hydrogen.

Catalysts

A variety of catalysts from various sources can be used at a variety of pressures, temperatures, gas flow rates, and molar ratios in order to establish the most efficient detritiation parameters. The preferred embodiment discloses a Teflon supported platinum catalyst, it should be understood the metal selected can be of a similar metal in the same class of platinum, it may be mixed or alloyed with at least one other metal engineered specifically for process throughput. The hydrophobic coating as disclosed in the preferred embodiment is of polytetrafluoroethylene (PTFE); other coatings as discussed above can be used, it is well known that PTFE has improved life cycle characteristics over other coatings, but operate at lower conversion rates. It might be a desirable trade off of efficiency for life cycle.

Addition of Humidifiers, Dehumidifiers, Heaters and Pumps

Figure 3:
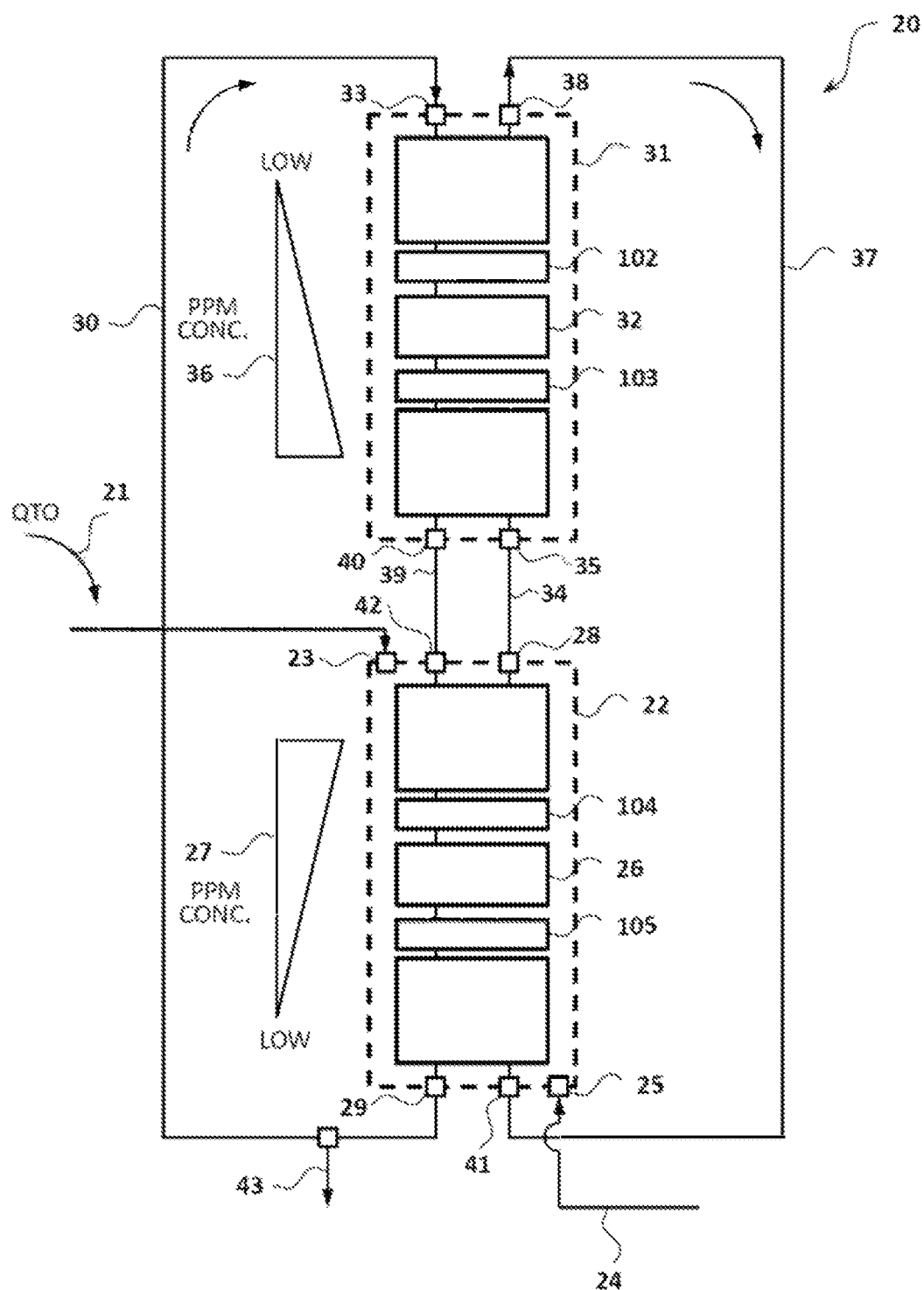
FIG. 3 illustrates the addition of humidifiers and dehumidifiers.

In an effort to scale the extraction process:

a. A humidifier and dehumidifier can be added ahead of or after the catalyst depending on where vapors are desired to be created and condensed. FIG. 3 depicts an alternate embodiment with humidifiers 102 and 104 and dehumidifiers 103 and 105.

b. A humidifier and or heaters can be installed in the process as required, such as the hydrogen gas stream.

c. One or more humidifiers or dehumidifiers may be added outside one or more of the columns at one or both ends depending on where vapors are desired to be created and condensed.

d. Pumps, flow detectors, and valves can be added at points in the system, including but not limited to second outlet 29 to move $Q_2O$, or at third outlet 38 to move $Q_2$, thereby establishing and maintaining a circulating profile through the first and second liquid phase catalytic exchange columns, wherein the dual column results in a managed mass balance of circulating fractions.

e. A variety of liquid and gas flow distributors can be used inside the columns to establish the most efficient flow distribution.

ALTERNATE CONFIGURATIONS

A variety of configurations can be implemented, including but not limited to the connection and positioning of the two columns, the column lengths, and the column diameters, as they relate to a variety of flow rates, molar ratios, and feed concentrations.

The above specification and examples provide a complete description of the structure and use of an exemplary embodiment. Although certain embodiments have been described above with a certain degree of particularity, or with reference to one or more individual embodiments, those skilled in the art could make numerous alterations to the disclosed embodiments without departing from the scope of this invention. As such, the illustrative embodiment of the present embodiment is not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The embodiments of the invention in which an exclusive property or privilege is claimed are defined as follows:

1. A closed loop continuous hydrogen isotope extraction system using a steady state cyclical dual column extraction, comprising:
    a first liquid phase catalytic exchange column to receive a mixture of clean hydrogen gas and contaminated feed water comprising at least one hydrogen isotope in the form of tritium, wherein the liquid phase catalytic exchange column includes one or more of a first hydrophobic catalyst operative to facilitate the exchange of the clean hydrogen gas with the hydrogen isotope in the feed water resulting in the generation of the hydrogen isotope as a gas and de-tritiated water as a liquid in the first catalytic exchange column;
    a second liquid phase catalytic exchange column to receive a mixture of gas generated from the first liquid phase catalytic exchange column containing the hydrogen isotope and de-tritiated water generated by the first liquid phase catalytic exchange column, wherein the second liquid phase catalytic exchange column includes a second hydrophobic catalyst operative to facilitate the exchange of the gas containing the hydrogen isotope and the de-tritiated water resulting in the generation and release of the hydrogen as clean hydrogen gas and contaminated water comprising at least one hydrogen isotope in the form of tritium, and wherein the second hydrophobic catalyst is further operative to process at least one of larger and smaller volumes of material than the first hydrophobic catalyst;
    a pump for establishing and maintaining a circulating profile through the first and second liquid phase catalytic exchange columns;
    a first valve to at least one of continuously and periodically introduce into the steady state cyclical dual column process additional contaminated feed water, wherein the additional feed water is introduced into the circulating profile of the first liquid phase catalytic exchange column;
    a second valve configured to at least one of continuously and periodically collect from the steady state cyclical dual column process at least one of an enriched fraction from the circulating profile and a clean fraction from the circulating profile;
    a first flow detector for monitoring the flow rate of the introduced contaminated feed over time, and a second flow detector for monitoring the flow rate of the at least one of collected enriched fraction and collected clean fraction, wherein the difference in fractions results in at least one of:
    (a) a steady state operation when the fractions introduced and fractions collected are the same,
    (b) a reduction in system concentration when the fractions introduced are less than the fractions collected, and
    (c) an increase in system concentration when the fractions introduced are more than the fractions collected.

2. The system of claim 1 wherein the molar fluxes in the first and second columns are independent of each other and adjusted to optimize fractions.

3. The system of claim 2 wherein the water and molar fluxes in the first and second column are independent of the feed molar flux.

4. The system of claim 1 wherein the hydrophobic catalyst in the liquid phase catalytic exchange columns are mixed and packed with a non-catalytic hydrophilic packing to enhance the exchange between water and water vapor, wherein the mixed catalytic bed results in acceleration of the at least one of the clean hydrogen-water isotope exchange in the first column and the hydrogen isotope-clean water exchange in the second column.

5. The system of claim 1 wherein the closed loop steady state operation does not generate a waste stream, wherein the waste stream is at least one of hydrogen gas, hydrogen isotope gas and oxygen gas.

6. The system of claim 1 wherein the dual column results in a managed mass balance of circulating fractions.

7. The system of claim 6 wherein the circulating fractions consist of: clean hydrogen gas, clean water, tritium gas, and tritiated water.

8. The system of claim 1 wherein the clean hydrogen gas is introduced through a third valve.

9. The system of claim 8 wherein the source of the clean hydrogen gas is at least one of a hydrogen gas generator and bottled gas, wherein the gas generator is an electrolyzer.

10. The system of claim 1 wherein the fractions introduced and fractions collected in the steady state operation include not collecting fractions and introducing fractions.

11. A closed loop continuous hydrogen isotope extraction method using a steady state cyclical dual column extraction, including:
    receiving a mixture of clean hydrogen gas and contaminated feed water comprising at least one hydrogen isotope in the form of tritium in a first liquid phase catalytic exchange column, wherein the liquid phase catalytic exchange column includes one or more of a first hydrophobic catalyst operative to facilitate the exchange of the clean hydrogen gas with the hydrogen isotope in the feed water resulting in the generation of the hydrogen isotope as a gas and de-tritiated water as a liquid in the first catalytic exchange column;
    receiving a mixture of gas generated from the first liquid phase catalytic exchange column containing the hydrogen isotope and de-tritiated water generated by the first liquid phase catalytic exchange column in a second liquid phase catalytic exchange column, wherein the second liquid phase catalytic exchange column includes a second hydrophobic catalyst operative to facilitate the exchange of the gas containing the hydrogen isotope and the de-tritiated water resulting in the generation and release of the hydrogen as clean hydrogen gas and contaminated water comprising at least one hydrogen isotope in the form of tritium, and wherein the second hydrophobic catalyst is further operative to process at least one of larger and smaller volumes of material than the first hydrophobic catalyst;

using a pump for establishing and maintaining a circulating profile through the first and second liquid phase catalytic exchange columns;

using a first valve to at least one of continuously and periodically introduce into the steady state cyclical dual column process additional contaminated feed water, wherein the additional feed water is introduced into the circulating profile of the first liquid phase catalytic exchange column;

using a second valve to at least one of continuously and periodically collect from the steady state cyclical dual column process at least one of an enriched fraction from the circulating profile and a clean fraction from the circulating profile;

using a first flow detector for monitoring the flow rate of the introduced contaminated feed over time, and a second flow detector for monitoring the flow rate of the at least one of collected enriched fraction and collected clean fraction, wherein the difference in fractions results in at least one of:

(a) a steady state operation when the fractions introduced and fractions collected are the same, (b) a reduction in system concentration when the fractions introduced are less than the fractions collected, and (c) an increase in system concentration when the fractions introduced are more than the fractions collected.

12. The method of claim 11 wherein the molar fluxes in the first and second columns are independent of each other and adjusted to optimize fractions.

13. The method of claim 12 wherein the water and molar fluxes in the first and second column are independent of the feed molar flux.

14. The method of claim 11 wherein the hydrophobic catalyst in the liquid phase catalytic exchange columns are mixed and packed with a non-catalytic hydrophilic packing to enhance the exchange between water and water vapor, wherein the mixed catalytic bed results in acceleration of the at least one of the clean hydrogen-water isotope exchange in the first column and the hydrogen isotope-clean water exchange in the second column.

15. The method of claim 11 wherein the closed loop steady state operation does not generate a waste stream, wherein the waste stream is at least one of hydrogen gas, hydrogen isotope gas and oxygen gas.

16. The method of claim 11 wherein the dual column results in a managed mass balance of circulating fractions.

17. The method of claim 16 wherein the circulating fractions consist of: clean hydrogen gas, clean water, tritium gas, and tritiated water.

18. The method of claim 11 wherein the clean hydrogen gas is introduced through a third valve.

19. The method of claim 18 wherein the source of the clean hydrogen gas is at least one of a hydrogen gas generator and bottled gas, wherein the gas generator is an electrolyzer.

20. The method of claim 11 wherein the fractions introduced and fractions collected in the steady state operation include not collecting fractions and introducing fractions.

* * * * *